United States Patent [19]
Oehler et al.

[11] Patent Number: 5,820,927
[45] Date of Patent: Oct. 13, 1998

[54] FILTER MATERIAL PRODUCTION PROCESS

[75] Inventors: William F. Oehler, Coventry; Timothy N. Obee, S. Windsor; Philip J. Birbara, Windsor Locks, all of Conn.

[73] Assignee: Carrier Corporation, Syracuse, N.Y.

[21] Appl. No.: 730,028

[22] Filed: Oct. 15, 1996

[51] Int. Cl.$^6$ ....................................................... B05D 7/22
[52] U.S. Cl. ........................... 427/181; 427/180; 427/244; 427/307; 427/385.5; 427/407.1; 502/417
[58] Field of Search ..................................... 427/180, 181, 427/244, 385.5, 407.1, 307; 502/417

[56] References Cited

U.S. PATENT DOCUMENTS

| | | |
|---|---|---|
| 2,961,710 | 11/1960 | Stark . |
| 3,238,056 | 3/1966 | Pall et al. . |
| 3,865,758 | 2/1975 | Yoshida et al. . |
| 4,664,683 | 5/1987 | Degen et al. . |
| 4,800,190 | 1/1989 | Smolik ..................................... 502/416 |
| 5,332,426 | 7/1994 | Tang et al. ................................ 96/153 |
| 5,338,340 | 8/1994 | Kasmark, Jr. et al. .................... 96/135 |

FOREIGN PATENT DOCUMENTS 2804154  1/1979  Germany .

Primary Examiner—Janyce Bell

[57] ABSTRACT

An open-pore polyurethane foam support body (20) is impregnated in a single step with a solution of a thermoplastic adhesive dissolved in a solvent that is also a foam expander, or in two sequential steps first with a foam expanding solution and then, after the foam has expanded, with a solution of a thermoplastic adhesive, to form an adhesive layer (40) on the surfaces (25) within the pores (22) and passages (24) of the foam body (20). Sorbent particles (30) of activated carbon are introduced into the expanded pores until the expanded foam is packed to the desired density of carbon particle loading. The impregnated and loaded foam is then air dried at room temperature to evaporate the foam expanding solution until the foam body contracts to substantially its original volume. Following air drying, the foam body may be heated in an inert atmosphere at a sufficient temperature and for a sufficient time to remove any solvent that still may be coating the exposed surfaces of the activated carbon particles and also to soften the adhesive layer to further strengthen the resultant bonding of the activated carbon particles to the foam support body. The foam filter material 10 is unique in that at least a portion of the activated carbon particles 30 are mechanically bonded to the foam support body 20 by a mechanical locking resulting from the shrinkage of the expanded foam body about the particles 30, while at least portion of the activated 30 are adhesively bonded to the foam support body 20 by the adhesive layer 40. A significant portion of the activated carbon particles 30 are both mechanically and adhesively bonded to the foam support body.

26 Claims, 1 Drawing Sheet

5,820,927

1

FILTER MATERIAL PRODUCTION PROCESS

BACKGROUND OF THE INVENTION

The present invention relates generally to the production of filter material for removing contaminants from air or other fluid streams. More particularly, the present invention relates to a process for producing a filter material formed of an open-pore foam support body having sorptive particles bonded to the surface of the open pores of the foam support body.

Filter materials formed of a porous substrate containing particulate material are well known in the art. For example, U.S. Pat. No. 3,238,056 to Pall et al discloses a filter material comprising a porous material substrate, having a proportion of pores ranging from greater than 25 microns up to about 150 microns in diameter, whose filtration characteristics are modified by impregnating the pores of the substrate with particulate material in an amount to reduce the pore diameter to less than 25 microns. The particulate material is deposited in the pores of the substrate by contacting the substrate with a fluid slurry of particulate material composed of a mixture at least 5% fibrous material, and preferably at least 25% of fibrous material, and nonfibrous particulate material. Pall et al disclose that any porous material whose pores extend from surface to surface may be used, including polyurethane and other forms, although the disclosed process is stated to be particularly useful for upgrading coarse filter media such as papers and nonwoven fibrous bats. Although Pall et al disclose that particulate material of any type may be used, including activated carbon as the nonfibrous particulate material, the preferred particulate material is composed of glass fiber as the fibrous component and diatomaceous earth of nonfibrous component.

U.S. Pat. No. 3,865,785 to Yoshida et al discloses a method of producing a polyurethane foam filter material containing an activated carbon adsorbent. According to the disclosed process, particles of activated carbon are pre-coated with a solid film of a selected polymeric material. A polyurethane foam-forming composition comprising isocyanates and polyesters and polyethers is reacted in the presence of the coated particles of activated carbon adsorbent to form a foam filter material. The film of polymeric material coating the activated carbon particles may be removed after the formation of the foamed product by treating the foamed product with a solvent which dissolves the polymeric coating on the activated carbon material, but does not substantially dissolve the resultant polyurethane foam. If necessary, excess solvent may be removed by washing or other conventional practices and thermally drying the polyurethane foam filter material.

U.S. Pat. No. 4,800,190 to Smolik discloses a process for the production of a filter material comprising an open-pore foam carrier having absorbent particles of different sizes fixed on the foam carrier and in the open pores thereof According to the disclosed process, after a layer of adhesive, such as modified acrylates, polyurethanes, silicone rubber, polyvisylidene, plyvinyl chloride, polyamide and polyester granules and powders, is applied to the pores of the open-pore foam carrier by impregnating the foam carrier with the adhesive, the first relatively larger absorbent particles are applied to the foam carrier and introduced into the open pores thereof and thereafter, prior to the adhesive setting, the second relatively smaller absorbent particles are applied to the foam carrier and introduced into the open pores thereof. Thereafter, the foam carrier is passed through a drying apparatus at temperatures of around 150° C. and those absorbent particles which are not fixed on the foam carrier or in the pores thereof are removed by suction.

SUMMARY OF THE INVENTION

An object of the present invention is to provide a process for the production of a filter material having a high sorbent particle density.

In accordance with the process of the present invention, an open-pore foam support body is treated with a foam expanding and the surfaces defined by the expanded pores are coated with an adhesive layer. Activated carbon particles are introduced into the pores and bonded to the surface of the pores by the adhesive layer coated therein.

In one embodiment of the process of the present invention, an open-pore polyurethane foam support body is impregnated with a solution of a thermoplastic adhesive dissolved in a solvent that is also a foam expander, for example a solution of ethylene vinyl acetate dissolved in methylene chloride. After the impregnated foam expands by about 30% in its volume, spherical and/or granular particles of activated carbon are introduced into the expanded pores until the expanded foam is packed to the desired density of carbon particle loading. The impregnated and loaded foam is then air dried at room temperature to evaporate remaining solvent until the foam body contracts to substantially its original volume resulting in a firm adhesive and mechanical bonding of the activated carbon particles to the foam body. Following air drying, the foam body may be heated in an inert atmosphere, for example in a stream of nitrogen gas, at a sufficient temperature and for a sufficient time, for example for about fifteen minutes at about 120° C., to remove any methylene chloride solvent that still may be coating the exposed surfaces of the activated carbon particles and also to soften the adhesive layer to further strengthen the resultant bonding of the activated carbon particles to the foam support body.

BRIEF DESCRIPTION OF THE DRAWING

The foregoing aspects and various features and advantages will become more apparent and be further understood from the following description of the preferred embodiments of the present invention, with reference to the accompanying drawings wherein.

DESCRIPTION OF THE PREFERRED EMBODIMENT

Figure 1:
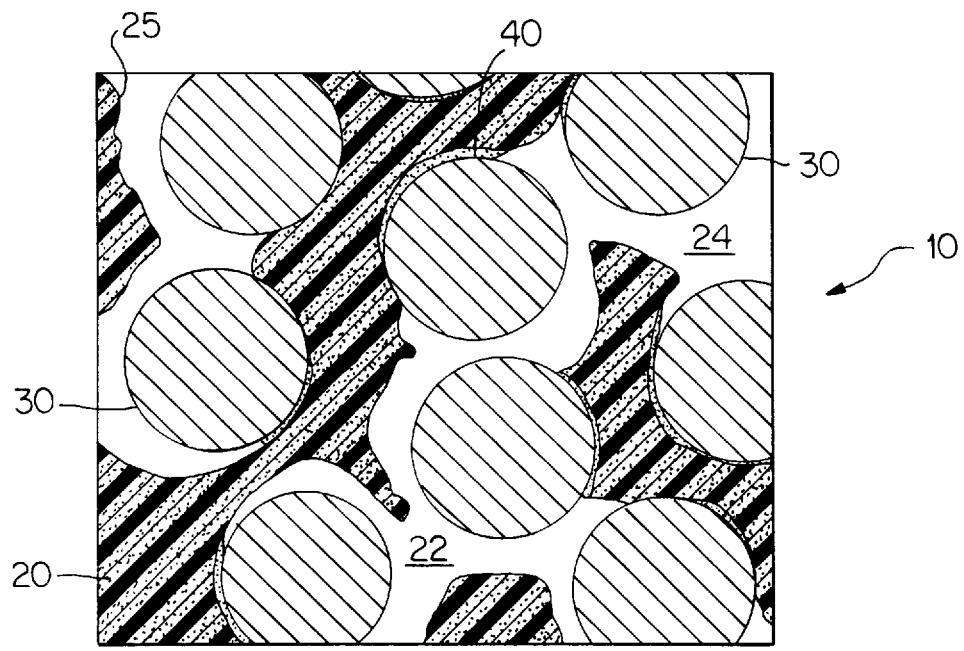
FIG. 1 is an illustrative and greatly magnified fragmentary, cross-sectioned, diagrammatic view of one embodiment of the filter material produced in accordance with the present invention.
Figure 2:
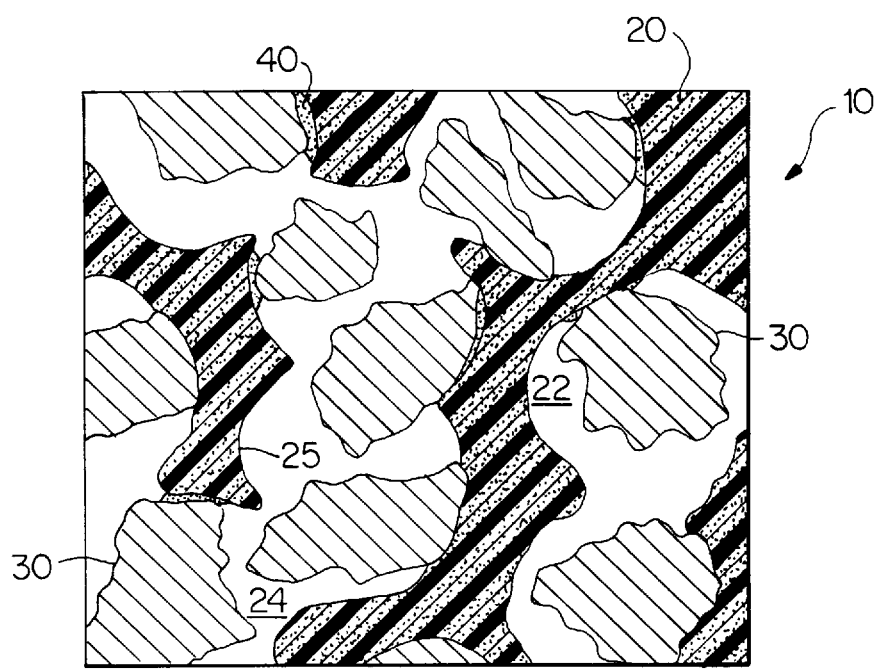
FIG. 2 is an illustrative and greatly magnified fragmentary, cross-sectional, diagrammatic view of an alternate embodiment of the filter material produced in accordance with the present invention.

There is depicted in each of FIGS. 1 and 2, a filter material 10, which is illustrated in cross-section on a greatly magnified scale, comprising an open-pore reticulated foam support body 20 incorporating sorptive particles 30. The pores 22 of the foam support body 20 communicate with each other and with the surface (not shown) of the foam support body 20, as in conventional foam support bodies, to form multiple branched networks of flow passages 24 through the foam support body 20 such that the foam support body 20 is porous to gas and liquid flow. The open-pore reticulated foam support body 20 is made of a foam material that will expand without dissolving or losing its open-pore reticulated structure when treated with a suitable foam expanding agent. The preferred foam material for forming the foam support body is polyurethane foam material. It is to be understood however, that other foam materials that exhibit appropriate expansion characteristics may also be used for forming the support body 20.

The sorptive particles 30 are secured within the open-pore structure of the foam support body 20 by both a mechanical bond and an adhesive bond to the surfaces 24 presented by the open pores 22 of the foam support body. To produce the filter material 10, the foam support body 20 is treated with a foam expanding agent and the surfaces defined by the expanded pores 22 are coated with an adhesive layer 40. The activated carbon particles 30 are introduced into the pores 22 and are adhesively bonded to the surfaces 25 defined of the pores 22 by the adhesive layer 40. Thereafter, when the foam support body 20 shrinks from its expanded state back to its original size and shape, the activated carbon particles 30 are entrapped by the foam material itself as the pores 22 shrink thereby mechanical bonding the activated carbon particles 30 to the foam structure.

In one mode for producing the filter material 10, the foam support body is contacted with both the foam expanding agent and thermoplastic adhesive in a single step. In this one-step mode, the open-pore polyurethane foam support body 20 is impregnated with a solution of a thermoplastic adhesive dissolved in a solvent that is also a foam expanding agent, for example a solution of ethylene vinyl acetate adhesive or polystyrene adhesive dissolved in methylene chloride at approximately a 10% solids concentration, to expand the pore structure and form the adhesive layer 40 on the surfaces 25 within the pores 22 and passages 24 of the expanded foam support body 20. After the impregnated foam support body 20 expands in its volume by the desired amount, the spherical and/or granular particles 30 of activated carbon are introduced into the expanded pores in an amount sufficient to pack the foam support body to the desired carbon particle loading. The foam support body 20 may be shaken, vibrated or otherwise manipulated as the particles 30 of activated carbon are introduced so as to ensure that the particles 30 fully penetrate the flow passages 24 and the pores 22, as well as come into contact with the adhesive layer 40 on the surfaces defined by the pores and the flow passages. The impregnated and loaded foam support body 20 is then air dried, typically at room temperature, to evaporate remaining solvent and contract the foam support body 20 back to substantially its original volume resulting in a firm adhesive and mechanical bonding of the activated carbon particles 30 to the foam support body 20. Following air drying, the foam support body 20 may be heated in an inert atmosphere, for example in a stream of nitrogen gas, at a sufficient time and for a sufficient temperature, for example for about fifteen minutes at about 120° C., to remove undesirable residues and any solvent that still may be coating the exposed surfaces of the activated carbon particles and also to soften the adhesive layer to further strengthen the resultant bonding of the activated carbon particles to the foam support body. For polyurethane foam, a temperature of 120° C. should not be exceeded as the foam structure could be damaged at higher temperatures.

Several combinations of adhesive and foam expanding solvent may be used in producing the filter material 10 via the single step mode. For example, if ethylene vinyl acetate is the adhesive to be used, suitable compounds which act both as an adhesive solvent and a foam expanding agent include: methylene chloride, acetone, methyl acetate and dichlorofloroethane (HCFC 141B), listed in descending order of effectiveness as a foam expanding agent. If polystyrene is to be used as the adhesive, suitable compounds which act as an adhesive solvent and a foam expanding agent include: N,N-Dimethylformamide (DMF), methylene chloride, methyl acetate and dichlorofiorethane (HCFC 141B), again listed in descending order of effectiveness as a foam expanding agent.

In another mode for producing the filter material 10, the foam support body is contacted first with the foam expanding agent and thereafter the expanded foam support body is contacted in a separate step with the thermoplastic adhesive. In this two-step mode, the open-pore polyurethane foam support body 20 is first impregnated with a solution of a foam expanding agent to expand the pore structure. After the impregnated foam support body 20 expands in its volume by the desired amount, the expanded foam support body 20 is impregnated with a solution of thermoplastic adhesive, for example ethylene vinyl acetate adhesive or polystyrene adhesive, dissolved in an adhesive solvent which need not exhibit any foam expanding action. In this two-step mode, the foam expanding agent may be selected to optimize expansion the pore structure of the foam support body 20 and the adhesive solvent may be selected to optimize dissolution of the particular thermoplastic adhesive being used to form the adhesive layer 40 on the surfaces 25 within the pores 22 and passages 24 of the expanded foam support body 20. After the adhesive layer 40 has been established, the spherical and/or granular particles 30 of activated carbon are introduced into the expanded pores in an amount sufficient to pack the foam support body to the desired carbon particle loading. Again, the foam support body 20 may be shaken, vibrated or otherwise manipulated as the particles 30 of activated carbon are introduced so as to ensure that the particles 30 fully penetrate the flow passages 24 and the pores 22, as well as come into contact with the adhesive layer 40 on the surfaces defined by the pores and the flow passages. The impregnated and loaded foam support body 20 is then air dried, typically at room temperature, to evaporate remaining solvent and contract the foam support body 20 back to substantially its original volume resulting in a firm adhesive and mechanical bonding of the activated carbon particles 30 to the foam support body 20. Following air drying, the foam support body 20 may be heated in an inert atmosphere, for example in a stream of nitrogen gas, at a sufficient time and for a sufficient temperature, for example for about fifteen minutes at about 120° C., to remove undesirable residues and any solvent that still may be coating the exposed surfaces of the activated carbon particles and also to soften the adhesive layer to further strengthen the resultant bonding of the activated carbon particles to the foam support body.

Several combinations of foam expanding agent and adhesive solvent may be used in producing the filter material 10 via the two step mode. For example, if ethylene vinyl acetate is the adhesive to be used, N,N-Dimethylformamide (DMF), which is ineffective as a solvent for ethylene vinyl acetate but highly effective as a foam expanding agent, may be used as the foam expanding agent, while a solvent such as tetrahydrofuran, for example, which is ineffective as a foam expanding agent but effective as a solvent for ethylene vinyl acetate, may be used as the adhesive solvent. Other compounds which act both as a polyurethane foam expanding agent and an ethylene vinyl acetate solvent, including for example methylene chloride, acetone, methyl acetate and dichlorofloroethane (HCFC 141B), listed in descending order of effectiveness as a polyurethane foam expanding agent, could also be used in various combinations or with either the N,N-Dimethylformamide (DMF) or the tetrahydrofuran, as appropriate. If polystyrene is to be used as the adhesive, for example, acetone, which is ineffective as a solvent for polystyrene but effective as a foam expanding agent, may be used as the foam expanding agent, while a solvent such as tetrahydrofuran, for example, which is ineffective as a foam expanding agent but effective as a solvent for polystyrene, may be used as the adhesive solvent. Other compounds which act both as a polyurethane foam expanding agent and a polystyrene solvent, including for example N,N-Dimethylformamide (DMF), methylene chloride, methyl acetate and dichloroflorethane (HCFC 141B), again listed in descending order of effectiveness as a polyurethane foam expanding agent.

The sorptive particles 30 may comprise activated carbon particles either in the form of substantially spherical particles of activated carbon or granular particles of activated carbon as depicted in FIG. 1 and FIG. 2, respectively. The sorptive particles 30 may also comprise a mixture of granular particles and substantially spherical particles of activated carbon. The sorptive particles 30 may be introduced into the reticulated pore structure of the foam support body 20 with the assistance of pressure or through use of calendar rollers or through the use of a carbon gun air stream. In any case, the density of a polyurethane foam filter material 10 loaded with activated carbon particles 30 produced in accordance with the present invention will have a density approaching or exceeding about 0.25 grams per cubic centimeter (0.25 gm/cm$^3$).

EXAMPLE 1

The process of the present invention is further described and understood through the following example. A solvent solution was prepared by dissolving 8.4 grams of ethylene vinyl acetate based adhesive, available from 3M Company under the brand name Jet-melt™ #3755 thermoplastic polymer adhesive, into 163 grams of methylene chloride. Solvation of the adhesive was aided by heating the solvent to 90° F. A foam disk measuring 5.3 centimeters in diameter and 0.6 centimeters in height and weighing 0.48 grams was formed from polyurethane reticulated foam having 25 pores per inch. The foam disk was placed in a dish and sufficient solvent solution was poured into the dish to completely immerse the disk. The disk was allowed to expand in its volume by 30%, whereafter the expanded disk was removed from the solvent solution and, after briefly allowing to drip dry to remove excess solvent liquid, was placed in a clean dish and set upon a vibrating table. Activated carbon particles of a mixed particle size ranging from 20 to 50 mesh (about 1.0 millimeter to 0.1 millimeters) were quickly poured onto the expanded foam while the foam was vibrated. The foam disk was turned over and additional activated carbon particles poured over the newly exposed portion of the disk. The activated carbon was introduced in a volume in excess of the volume of the pore structure of the reticulated foam disk. The vibration of the disk and pouring of the activated carbon particles over the foam disk continued until the expanded foam disk had shrunk, due to the evaporation of the methylene chloride solvent, to substantially its original volume. The foam disk was then placed into an oven and heated to 30° C. to remove residual methylene chloride solvent from the activated carbon particles. The activated carbon particle loading in the resultant foam filter material was about 0.23 grams per cubic centimeter.

The foam filter material produced in accordance with the process of the present invention is unique in that at least a portion of the activated carbon particles 30 are mechanically bonded to the foam support body 20 by a mechanical locking resulting from the shrinkage of the expanded foam body about the particles 30, while at least portion of the activated 30 are adhesively bonded to the foam support body 20 by the adhesive layer 40. A significant portion of the activated carbon particles 30 are both mechanically and adhesively bonded to the foam support body. In this manner, very high particle loadings of activated carbon particles within the foam support body, for example particle loadings approaching or exceeding 0.25 grams per cubic centimeter (0.25 gm/cm$^3$), may be obtained.

Although the process of the present invention has been described with respect to the best modes presently contemplated for carrying out the process of the present invention, it should be understood that various modifications, omissions and additions in the form and detail thereof may suggest themselves to those skilled in the art and may be made without departing from the spirit and scope of the invention as hereafter defined by the claims. For example, although described as applied to producing a polyurethane foam filter, the invention may be modified by selection of an appropriate adhesive and foam expander to produce a sorbent containing filter material from other types of foam. Also, although described with respect to the incorporation of activated carbon particles as the sorbent in the foam support body, the process of the invention present may be readily used to incorporate other types of sorbent agents and combinations of sorbent agents into a reticulated foam support body to produce a foam filter material.

What is claimed is:

1. A process for the production of a filter material comprising: treating an open-pore polyurethane foam support body having a reticulated pore structure with a polyurethane foam expanding agent to expand the reticulated pore structure of the foam support body, coating the surface of the expanded reticulated pore structure of the foam support body with a layer of an adhesive, introducing sorbent particles into the expanded and adhesive coated reticulated pore structure of the foam support body, and contracting the foam support body to substantially its original volume prior to treatment with the foam expanding agent whereby at least a portion of the sorbent particles are mechanically bonded to the foam support body and at least a portion of the sorbent particles are adhesively bonded to the foam support body.

2. A process as recited in claim 1 wherein the steps of treating an open-pore polyurethane foam support body having a reticulated pore structure with a polyurethane foam expanding solvent to expand the reticulated pore structure of the foam support body and coating the surface of the expanded reticulated pore structure of the foam support body with a layer of an adhesive comprise impregnating the foam support body with a solution of an adhesive dissolved in a foam expanding agent.

3. A process as recited in claim 2 wherein the adhesive comprises ethylene vinyl acetate and the foam expanding agent is selected from the group consisting of methylene chloride, acetone, methyl acetate and dichlorofloroethane.

4. A process as recited in claim 3 further comprising thermally treating the contracted foam support body.

5. A process as recited in claim 4 wherein the sorbent particles comprise activated carbon particles.

6. A process as recited in claim 4 wherein the sorbent particles comprises activated carbon particles.

7. A process as recited in claim 2 wherein the adhesive comprises polystyrene and the foam expanding agent is selected from the group consisting of methylene chloride, N,N-Dimethylformamide (DMF), methyl acetate and dichlorofloroethane.

8. A process as recited in claim 7 further comprising thermally treating the contracted foam support body.

9. A process as recited in claim 1 wherein the step of treating an open-pore polyurethane foam support body having a reticulated pore structure with a polyurethane foam expanding agent to expand the reticulated pore structure of the foam support body comprises impregnating the foam support body with a solution of a foam expanding agent selected from the group consisting of methylene chloride, acetone, methyl acetate, N,N-Dimethylformamide (DMF) and dichlorofloroethane.

10. A process as recited in claim 9 wherein the step of coating the surface of the expanded reticulated pore structure of the foam support body with a layer of an adhesive comprises impregnating the expanded foam support body with a solution of ethylene vinyl acetate dissolved in a solute selected from the group consisting of methylene chloride, acetone, methyl acetate, dichlorofloroethane and tetrahydrofuran.

11. A process as recited in claim 10 wherein the sorbent particles comprises activated carbon particles.

12. A process as recited in claim 9 wherein the step of coating the surface of the expanded reticulated pore structure of the foam support body with a layer of an adhesive comprises impregnating the expanded foam support body with a solution of polystyrene dissolved in a solute selected from the group consisting of methylene chloride, methyl acetate, dichlorofloroethane, N,N-Dimethylformamide (DMF) and tetrahydrofuran.

13. A process as recited in claim 12 wherein the sorbent particles comprises activated carbon particles.

14. A process for the production of a filter material comprising: treating an open-pore polyurethane foam support body having a reticulated pore structure with a polyurethane foam expanding agent to expand the reticulated pore structure of the foam support body, coating the surface of the expanded reticulated pore structure of the foam support body with a layer of a thermoplastic adhesive, introducing sorbent particles into the expanded and adhesive coated reticulated pore structure of the foam support body, and contracting the foam support body to substantially its original volume prior to treatment with the foam expanding agent whereby at least a portion of the sorbent particles are mechanically bonded to the foam support body, and further comprising thermally treating the contracted foam support body whereby at least a portion of the sorbent particles are bonded by the thermoplastic adhesive to the surfaces defined by the reticulated pore structure of the foam support body.

15. A process as recited in claim 14 wherein the steps of treating an open-pore polyurethane foam support body having a reticulated pore structure with a polyurethane foam expanding solvent to expand the reticulated pore structure of the foam support body and coating the surface of the expanded reticulated pore structure of the foam support body with a layer of an adhesive comprise impregnating the foam support body with a solution of a thermoplastic adhesive dissolved in a foam expanding agent.

16. A process as recited in claim 15 wherein the thermoplastic adhesive comprises ethylene vinyl acetate.

17. A process as recited in claim 16 wherein the foam expanding agent is selected from the group consisting of methylene chloride, acetone, methyl acetate and dichlorofloroethane.

18. A process as recited in claim 17 wherein the sorbent particles comprises activated carbon particles.

19. A process as recited in claim 18 wherein the thermoplastic adhesive comprises polystyrene.

20. A process as recited in claim 19 wherein the foam expanding agent is selected from the group consisting of methylene chloride, N,N-Dimethylformamide (DMF), methyl acetate and dichlorofloroethane.

21. A process as recited in claim 20 wherein the sorbent particles comprises activated carbon particles.

22. A process as recited in claim 14 wherein the step of treating an open-pore polyurethane foam support body having a reticulated pore structure with a polyurethane foam expanding agent to expand the reticulated pore structure of the foam support body comprises impregnating the foam support body with a solution of a foam expanding agent selected from the group consisting of methylene chloride, acetone, methyl acetate, N,N-Dimethylformamide (DMF) and dichlorofloroethane.

23. A process as recited in claim 22 wherein the step of coating the surface of the expanded reticulated pore structure of the foam support body with a layer of a thermoplastic adhesive comprises impregnating the expanded foam support body with a solution of ethylene vinyl acetate dissolved in a solute selected from the group consisting of methylene chloride, acetone, methyl acetate, dichlorofloroethane and tetrahydrofuran.

24. A process as recited in claim 23 wherein the sorbent particles comprise activated carbon particles.

25. A process as recited in claim 22 wherein the step of coating the surface of the expanded reticulated pore structure of the foam support body with a layer of a thermoplastic adhesive comprises impregnating the expanded foam support body with a solution of polystyrene dissolved in a solute selected from the group consisting of methylene chloride, methyl acetate, dichlorofloroethane, N,N-Dimethylformamide (DMF) and tetrahydrofuran.

26. A process as recited in claim 25 wherein the sorbent particles comprise activated carbon particles.

* * * * *